United States Patent
Chen et al.

(10) Patent No.: US 11,809,429 B2
(45) Date of Patent: Nov. 7, 2023

(54) METHOD FOR PROCESSING MODEL PARAMETERS, AND APPARATUS

(71) Applicant: BEIJING BYTEDANCE NETWORK TECHNOLOGY CO., LTD., Beijing (CN)

(72) Inventors: Cheng Chen, Beijing (CN); Peng Zhao, Beijing (CN); Di Wu, Beijing (CN); Junyuan Xie, Beijing (CN); Chenliaohui Fang, Beijing (CN); Longyijia Li, Beijing (CN); Long Huang, Beijing (CN); Liangchao Wu, Beijing (CN); Long Chang, Beijing (CN); Lizhe Zhang, Beijing (CN); Yixiang Chen, Beijing (CN); Xiaobing Liu, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/886,746

(22) Filed: Aug. 12, 2022

(65) Prior Publication Data
US 2023/0023253 A1    Jan. 26, 2023

Related U.S. Application Data

(63) Continuation of application No. PCT/CN2021/080876, filed on Mar. 15, 2021.

(30) Foreign Application Priority Data

Apr. 8, 2020    (CN) .......................... 202010269954.8

(51) Int. Cl.
G06F 7/00      (2006.01)
G06F 16/00     (2019.01)
(Continued)

(52) U.S. Cl.
CPC ........ *G06F 16/24552* (2019.01); *G06F 9/547* (2013.01)

(58) Field of Classification Search
None
See application file for complete search history.

(56) References Cited

U.S. PATENT DOCUMENTS 8,768,870 B1 * 7/2014 Corrado ................... G06N 7/08
                                                    706/12
9,400,832 B1 * 7/2016 Mayle .................. G06Q 10/103
(Continued)

FOREIGN PATENT DOCUMENTS

CN    106155779 A    11/2016
CN    107516090 A    12/2017
(Continued)

OTHER PUBLICATIONS

International Patent Application No. PCT/CN2021/080876; Int'l Search Report; dated Jun. 18, 2021; 3 pages.
(Continued)

*Primary Examiner* — Tuan A Pham
(74) *Attorney, Agent, or Firm* — BakerHostetler (57) ABSTRACT

Provided are a method for processing model parameters, and an apparatus. The method comprises: a model parameter set to be sharded is obtained, wherein the model parameter set comprises a multi-dimensional array corresponding to a feature embedding; attribute information for a storage system used for storing the model parameter set to be sharded is obtained, wherein the storage system used for storing the model parameter set to be sharded differs from a system on which a model corresponding to the model parameter set to be sharded is located when operating; the model parameter set to be sharded is stored in the storage system according to the attribute information.

15 Claims, 5 Drawing Sheets

(51) Int. Cl.
  *G06F 16/2455* (2019.01)
  *G06F 9/54* (2006.01)

(56) References Cited

U.S. PATENT DOCUMENTS

| | | | |
|---|---|---|---|
| 2017/0076198 A1 | 3/2017 | Jin et al. | |
| 2019/0073590 A1* | 3/2019 | Wu | G06F 9/00 |
| 2019/0325302 A1 | 10/2019 | Savic et al. | |
| 2019/0392296 A1 | 12/2019 | Brady et al. | |

FOREIGN PATENT DOCUMENTS

| | | |
|---|---|---|
| CN | 107609652 A | 1/2018 |
| CN | 107622310 A | 1/2018 |
| CN | 107633219 A | 1/2018 |
| CN | 107679625 A | 2/2018 |
| CN | 107729353 A | 2/2018 |
| CN | 108053034 A | 5/2018 |
| CN | 108875955 A | 11/2018 |
| CN | 109543726 A | 3/2019 |
| CN | 109635948 A | 4/2019 |
| CN | 110472747 A | 11/2019 |
| CN | 110929886 A | 3/2020 |
| CN | 111680799 A | 9/2020 |

OTHER PUBLICATIONS

European Patent Application No. 21784005.7; Extended Search Report; dated Jun. 15, 2023; 8 pages.

Bruss et al.; "Graph Embeddings at Scale"; Machine Learning; arXiv:1907.01705; Jul. 2019; 9 pages.

Zheng et al.; "ShadowSync: Performing Synchronization in the Background for Highly Scalable Distributed Training"; Machine Learning; arXiv:2003.03477; Mar. 2020; 18 pages.

Abadi et al.; "TensorFlow: A system for large-scale machine learning"; 12th USENIX Symposium on Operating Systems Design and Implementation; Nov. 2016; p. 266-283.

\* cited by examiner

METHOD FOR PROCESSING MODEL PARAMETERS, AND APPARATUS

The present application is a continuation of International Patent Application No. PCT/CN2021/080876 filed on Mar. 15, 2021, which claims the priority to Chinese Patent Application No. 202010269954.8, titled "METHOD FOR PROCESSING MODEL PARAMETERS, AND APPARATUS", filed on Apr. 8, 2020, with the Chinese Patent Office, both of which are incorporated herein by reference in their entireties.

FIELD

The present disclosure relates to the technical field of computers, and in particular to a method and an apparatus for processing model parameters.

BACKGROUND

With the rapid development of machine learning technology, the types of models are becoming abundant. The size of the model increases with the complexity of the model structure.

In the machine learning technology, various information (such as documents, videos, and user attribute information) is usually required for performing feature embedding. In performing training based on large-scale feature embedding, the large-scale feature embedding is usually distributed on multiple parameter servers for training, and the distributed large-scale feature embedding is recombined into a complete model after the training is performed. In performing inference on a model, it is often required to load the complete model.

SUMMARY

According to the embodiments of the present disclosure, a method and an apparatus for processing model parameters are provided.

In a first aspect, a method for processing model parameters is provided according to some embodiments of the present disclosure. The method includes: obtaining a to-be-sharded model parameter set, where the model parameter set includes a multi-dimensional array corresponding to a feature embedding; obtaining attribute information of a storage system storing the to-be-sharded model parameter set, where the storage system storing the to-be-sharded model parameter set is different from a system on which a model corresponding to the to-be-sharded model parameter set operates; and storing the to-be-sharded model parameter set in the storage system based on the attribute information.

In some embodiments, the obtaining a to-be-sharded model parameter set includes: obtaining a model file corresponding to the to-be-sharded model parameter set; performing analysis on the model file to obtain an analysis graph corresponding to the model file, where the analysis graph includes variables and operations on the variables; extracting a variable from the analysis graph as a target variable based on a preset field; and obtaining the to-be-sharded model parameter set based on a feature embedding corresponding to the target variable.

In some embodiments, the obtaining the to-be-sharded model parameter set based on a feature embedding corresponding to the target variable includes: obtaining a data amount of a multi-dimensional array corresponding to the feature embedding corresponding to the target variable; and in response to determining that the obtained data amount is greater than a preset data amount threshold, obtaining the multi-dimensional array corresponding to the feature embedding corresponding to the target variable as the to-be-sharded model parameter set.

In some embodiments, the method further includes: receiving a feature embedding query operation corresponding to the to-be-sharded model parameter set; based on the feature embedding query operation, querying the storage system for a result matching the feature embedding query operation; and transmitting the result matching the feature embedding query operation.

In some embodiments, the attribute information includes storage space distribution of the storage system. The storing the to-be-sharded model parameter set in the storage system based on the attribute information includes: generating a model parameter allocation table based on the attribute information, where the model parameter allocation table represents a correspondence relationship between the to-be-sharded model parameter set and storage locations of the storage system; and based on the model parameter allocation table, storing the to-be-sharded model parameter set in a corresponding storage location in the storage system, and generating a query interface.

In some embodiments, the attribute information includes an identifier of a key-value (KV) storage system. The storing the to-be-sharded model parameter set in the storage system based on the attribute information includes: obtaining a previously updated model parameter set as a reference model parameter set; determining a difference between the to-be-sharded model parameter set and the reference model parameter set, and generating an updated model parameter set; storing the updated model parameter set in the storage system based on the attribute information.

In some embodiments, the method further includes: receiving a feature embedding query operation corresponding to the to-be-sharded model parameter set; generating a corresponding number of remote procedure call requests based on the feature embedding query operation; transmitting the remote procedure call (RPC) requests to the key-value storage system; and in response to receiving response information from the key-value storage system including a result that matches the feature embedding query operation, transmitting the result that matches the feature embedding query operation.

In a second aspect, an apparatus for processing model parameters is provided according to some embodiments of the present disclosure. The apparatus includes: a first obtaining unit, a second obtaining unit, and a storage unit. The first obtaining unit is configured to obtain a to-be-sharded model parameter set, where the model parameter set includes a multi-dimensional array corresponding to a feature embedding. The second obtaining unit is configured to obtain attribute information of a storage system storing the to-be-sharded model parameter set, where the storage system storing the to-be-sharded model parameter set is different from a system on which a model corresponding to the to-be-sharded model parameter set operates. The storage unit is configured to store the to-be-sharded model parameter set in the storage system based on the attribute information.

In some embodiments, the first obtaining unit includes: a first obtaining sub-unit, an analysis sub-unit, an extraction sub-unit, and a second obtaining sub-unit. The first obtaining sub-unit is configured to obtain a model file corresponding to the to-be-sharded model parameter set. The analysis sub-unit is configured to performing analysis on the model file to obtain an analysis graph corresponding to the model file, where the analysis graph includes variables and operations on the variables. The extraction sub-unit is configured to extract a variable from the analysis graph as a target variable based on a preset field. The second obtaining sub-unit is configured to obtain the to-be-sharded model parameter set based on a feature embedding corresponding to the target variable.

In some embodiments, the second obtaining sub-unit includes: a first obtaining module and a second obtaining module. The first obtaining module is configured to obtain a data amount of a multi-dimensional array corresponding to the feature embedding corresponding to the target variable. The second obtaining module is configured, in response to determining that the obtained data amount is greater than a preset data amount threshold, obtain the multi-dimensional array corresponding to the feature embedding corresponding to the target variable as the to-be-sharded model parameter set.

In some embodiments, the apparatus further includes: a first reception unit, a first querying unit, and a first transmission unit. The first reception unit is configured to receive a feature embedding query operation corresponding to the to-be-sharded model parameter set. The first querying unit is configured, based on the feature embedding query operation, to query the storage system for a result matching the feature embedding query operation. The first transmission unit is configured to transmit the result matching the feature embedding query operation.

In some embodiments, the attribute information includes storage space distribution of the storage system. The storage unit includes: a first generation sub-unit and a first storage sub-unit. The first generation sub-unit is configured to generate a model parameter allocation table based on the attribute information, where the model parameter allocation table represents a correspondence relationship between the to-be-sharded model parameter set and storage locations of the storage system. The first storage sub-unit is configured, based on the model parameter allocation table, to store the to-be-sharded model parameter set in a corresponding storage location in the storage system, and generate a query interface.

In some embodiments, the attribute information includes an identifier of a key-value storage system. The storage unit includes: a third obtaining sub-unit, a second generation sub-unit, and a second storage sub-unit. The third obtaining sub-unit is configured to obtain a previously updated model parameter set as a reference model parameter set. The second generation sub-unit is configured to determine a difference between the to-be-sharded model parameter set and the reference model parameter set, and generate an updated model parameter set. The second storage sub-unit is configured to store the updated model parameter set in the storage system based on the attribute information.

In some embodiments, the apparatus further includes: a second reception unit, a generation unit, a second transmission unit, and a third transmission unit. The second reception unit is configured to receive a feature embedding query operation corresponding to the to-be-sharded model parameter set. The generation unit is configured to generate a corresponding number of remote procedure call requests based on the feature embedding query operation. The second transmission unit is configured to transmit the remote procedure call requests to the key-value storage system. The third transmission unit is configured, in response to receiving response information from the key-value storage system including a result that matches the feature embedding query operation, to transmit the result that matches the feature embedding query operation.

In a third aspect, a server is provided according to some embodiments of the present disclosure. The server includes one or more processors and a storage device. The storage device stores one or more programs. The one or more programs, when executed by the one or more processors, cause the one or more processors to perform the method according to the embodiments in the first aspect.

In a fourth aspect, a computer-readable medium is provided according to some embodiments of the present disclosure. The computer-readable medium stores a computer program. The computer program, when executed by a processor, causes the processor to perform the method according to the embodiments in the first aspect.

In a fifth aspect, a computer program product is provided according to some embodiments of the present disclosure. The computer program product includes a computer program. The computer program, when executed by a processor, causes the processor to perform the method according to the embodiments in the first aspect.

In a sixth aspect, a computer program is provided according to some embodiments of the present disclosure. The computer program, when executed by a processor, causes the processor to perform the method according to the embodiments in the first aspect.

With the method and an apparatus for processing model parameters according to the embodiments of the present disclosure, a to-be-sharded model parameter set is obtained. The model parameter set includes a multi-dimensional array corresponding to a feature embedding. Then, attribute information of a storage system storing the to-be-sharded model parameter set is obtained. The storage system storing the to-be-sharded model parameter set is different from a system on which a model corresponding to the to-be-sharded model parameter set operates. Finally, the to-be-sharded model parameter set is stored in the storage system based on the attribute information. Therefore, the model parameter set that occupies a large space is separated from the system on which the model operates, thereby optimizing the parameter storage of large-scale feature embedding and improving resource utilization efficiency.

BRIEF DESCRIPTION OF THE DRAWINGS

Other features, objects and advantages of the present disclosure will be more apparent by reading the detailed description of non-limiting embodiments made in conjunction with the following drawings.

DETAILED DESCRIPTION OF THE EMBODIMENTS

The present disclosure is described in detail below with reference to the accompanying drawings and embodiments. It should be understood that the embodiments in the present disclosure are only illustrative of the disclosure, and are not intended to limit the present disclosure. In addition, it should be noted that, for the convenience of description, only the parts related to the present disclosure are shown in the drawings.

It should be noted that the embodiments in the present disclosure and the features of the embodiments may be combined with each other in the case of no conflict. The present disclosure is described in detail below with reference to the accompanying drawings and in conjunction with the embodiments.

Figure 1:
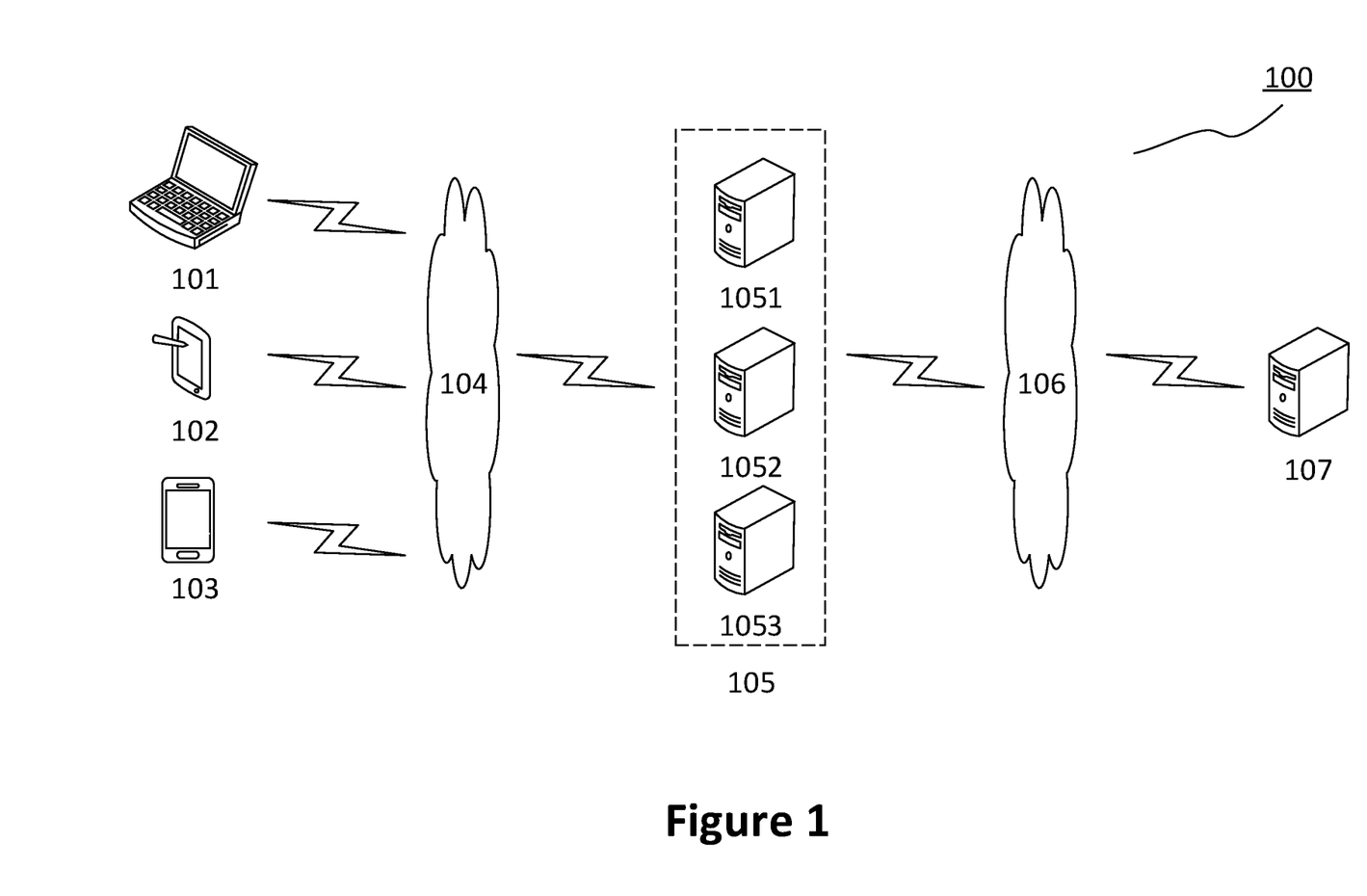
FIG. 1 is an exemplary system architecture to which an embodiment of the present disclosure may be applied.

FIG. 1 shows an exemplary architecture 100 to which a method for processing model parameters or an apparatus for processing model parameters according to the present disclosure may be applied.

As shown in FIG. 1, the system architecture 100 may include terminal devices 101, 102 and 103, networks 104 and 106, a server cluster 105, and a server 107. The network 104 is configured to provide a medium for communication links between the terminal devices 101, 102, 103 and the server cluster 105. The network 106 is configured to provide a medium for communication links between the server cluster 105 and the server 107. The networks 104 and 106 may include various connections, such as wired connections, wireless communication links, or fiber optic cables.

The terminal devices 101, 102, and 103 interact with the server cluster 105 through the network 104 to receive or transmit messages and the like. Various communication client applications, such as web browser applications, shopping applications, search applications, instant messaging tools and machine learning software, may be installed on the terminal devices 101, 102 and 103.

The terminal devices 101, 102, and 103 may be hardware or software. In a case that the terminal devices 101, 102, and 103 are hardware, the terminal devices 101, 102, and 103 may be various electronic devices that have a display screen and support the operation of machine learning software, including but not limited to smart phones, tablet computers, laptop computers and desktop computers, and the like. In a case that the terminal devices 101, 102, and 103 are software, the terminal devices 101, 102, and 103 may be installed in the electronic devices listed above, may be implemented as multiple software or software modules (such as, software or software modules for providing distributed services), or may be implemented as a single software or software module, which are not limited herein.

The server cluster 105 and the server 107 may be servers providing various services, such as backend servers providing support for the training and inferring machine learning models performed on the terminal devices 101, 102, and 103. In a case of adopting a distributed training Tensorflow model, the server cluster 105 may adopt PS (Parameter Server) architecture. The server cluster 105 may perform distributed training on the models, and transmit parameters of the models to the server 107 via the network 106 for storage. In inferring the models, the server cluster 105 may transmit a request for obtaining parameters of a model to the server 107 via the network 106, and the server 107 may return a corresponding result to the server cluster 105, so as to infer the models.

It should be noted that the server may be hardware or software. In a case that the server is hardware, the server may be implemented as a distributed server cluster including multiple servers, or may be implemented as a single server. In a case that the server is software, the server may be implemented as multiple software or software modules (for example, software or software modules for providing distributed services), or may be implemented as a single software or software module. There is no limitation herein.

It should be noted that the method for processing model parameters according to the embodiments of the present disclosure is generally performed by the server 107. Accordingly, the apparatus for processing model parameters is generally arranged in the server 107.

It should be understood that the numbers of the terminal devices, the networks and the servers in FIG. 1 are merely illustrative. Any number of terminal devices, networks, and servers may be provided according to implementation requirements.

Figure 2:
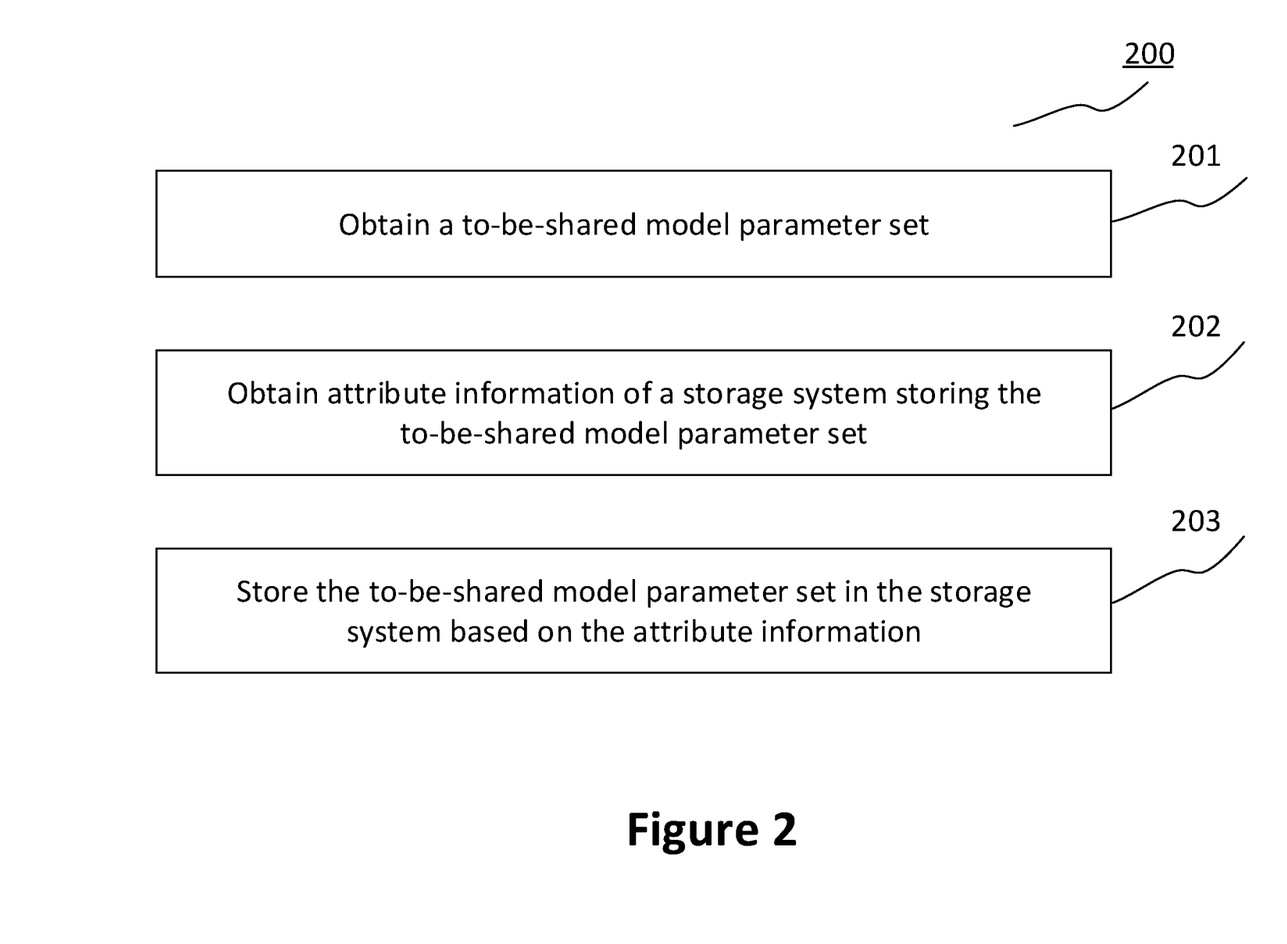
FIG. 2 is a flow chart of a method for processing model parameters according to an embodiment of the present disclosure.

Reference is made to FIG. 2, which shows a flow chart 200 of a method for processing model parameters according to an embodiment of the present disclosure. The method for processing model parameters includes the following steps 201 to 203.

In step 201, a to-be-sharded model parameter set is obtained.

In the embodiment, the execution body (the server 107 shown in FIG. 1) of the method for processing model parameters may obtain the to-be-sharded model parameter set through a wired connection or a wireless connection. The to-be-sharded model parameter set may include various model parameter sets used for distributed storage, for example, a multidimensional array corresponding to a feature embedding. The multi-dimensional array may be used as a set of various feature embedding.

It should be noted that the model parameters are usually adjusted parameters of the model after the model is trained, which are different from "hyper parameters" of the model. As an example, the multidimensional array may be a "lookup table" in Tensorflow.

In the embodiment, as an example, the execution body may obtain a locally pre-stored to-be-sharded model parameter set. As another example, the execution body may obtain a to-be-sharded model parameter set from an electronic device (for example, the server cluster 105 shown in FIG. 1) communicatively connected to the execution body.

In some optional implementations of the embodiment, the to-be-sharded model parameter set may include model parameters of a sub-model of a joint training model. The joint training model may include various models that are jointly trained by multiple participants by transferring intermediate values (such as, gradients) of the models without exposing original sample data. The model parameters of the sub-model of the joint training model may include adjusted model parameters obtained by the multiple participants performing joint training on the local models.

In some optional implementations of the embodiment, the execution body may obtain the to-be-sharded model parameter set by performing the following four steps.

In a first step, a model file corresponding to the to-be-sharded model parameter set is obtained.

In the implementations, the execution body may obtain the model file corresponding to the to-be-sharded model parameter set in various ways. The model file may generally include the to-be-sharded model parameter set. As an example, the model file may be a checkpoint file loaded by using Tensorflow. In practice, the execution body may usually obtain the model file from a communicatively connected electronic device (for example, the server cluster 105 shown in FIG. 1).

In a second step, analysis is performed on the model file to obtain an analysis graph corresponding to the model file.

In the implementations, the execution body may perform analysis on the model file obtained in the first step in various ways to generate an analysis graph corresponding to the model file. The analysis graph may include variables and operations on variables. As an example, in Tensorflow, the graph obtained by performing analysis on the model file may include nodes and edges. The analysis graph may display variables and operations on the variables in an original model file.

In a third step, a variable is extracted from the analysis graph as a target variable based on a preset field.

In the implementations, the execution body may extract a variable from the analysis graph generated in the second step in various ways as a target variable based on a preset field. The preset field may be matched with the model parameter set. As an example, the model parameter set may include a "lookup table", and the preset field may be, for example, "embedding lookup". Thus, the execution subject may extract a variable associated with the feature embedding from the analysis graph as the target variable.

In a fourth step, the to-be-sharded model parameter set is obtained based on a feature embedding corresponding to the target variable.

In the implementations, based on the feature embedding corresponding to the target variable extracted in the third step, the execution subject may obtain the to-be-sharded model parameter set in various ways. As an example, the execution body may obtain a multi-dimensional array corresponding to the feature embedding corresponding to the target variable as the to-be-sharded model parameter set.

Optionally, based on the optional implementations, the execution body may obtain the to-be-sharded model parameter set by performing the following steps S1 and S2.

In step S1, a data amount of a multi-dimensional array corresponding to the feature embedding corresponding to the target variable is obtained.

In the implementations, the execution body may first obtain the data amount of the multi-dimensional array corresponding to the feature embedding corresponding to the target variable. The data amount may represent an occupied storage space.

In step S2, in response to determining that the obtained data amount is greater than a preset data amount threshold, the multi-dimensional array corresponding to the feature embedding corresponding to the target variable is obtained as the to-be-sharded model parameter set.

In the implementations, in response to determining that the data amount obtained in step S1 is greater than a preset data amount threshold, the execution subject may obtain the multi-dimensional array corresponding to the feature embedding corresponding to the target variable as the to-be-sharded model parameter set. The preset data amount threshold may be, for example, 1G or 2G.

Based on the optional implementations, the execution body may store the model parameter set and other parts of the model separately in a case that the space occupied by the model parameter set is larger than a preset threshold, thereby reducing data transmission due to the small data amount of the model parameter set and obviously improving the resource utilization rate.

In step 202, attribute information of a storage system storing the to-be-sharded model parameter set is obtained.

In the embodiment, the execution body may obtain attribute information of the storage system storing the to-be-sharded model parameter set in various ways. The attribute information of the storage system storing the to-be-sharded model parameter set may include, but is not limited to, at least one of storage space distribution of the storage system and an identifier of a key-value storage system. The storage space distribution of the storage system may include storage capacities of storage units in the storage system, such as the number of parameter servers in the PS architecture of Tensorflow or storage capacity information of each of the parameter servers. The identifier of the key-value storage system may include various information for identifying the key-value storage system. The key-value storage system may be located locally or remotely of the execution body, which is not limited herein. As an example, the key-value storage system may be located in a local disk or an AEP (Apache Pass, that is, a non-volatile storage device). As another example, the key-value storage system may be located in an electronic device communicatively connected to the execution body. Optionally, the key-value storage system may further include a local cache, thereby improving query efficiency.

In the embodiment, the storage system storing the to-be-sharded model parameter set is generally different from a system on which a model corresponding to the to-be-sharded model parameter set operates. As an example, the system on which the model corresponding to the to-be-sharded model parameter set operates may be, for example, the server cluster 105 shown in FIG. 1. The storage system storing the to-be-sharded model parameter set may be, for example, the server 107 as shown in FIG. 1, or may be another electronic device (such as, a cloud storage system) communicatively connected to the server 107.

In step 203, the to-be-sharded model parameter set is stored in the storage system based on the attribute information.

In the embodiment, based on the attribute information obtained in step 202, the execution body may store the to-be-sharded model parameter set obtained in step 201 in the storage system corresponding to the attribute information obtained in step 202 in various ways.

In some optional implementations of the embodiment, in a case that the attribute information includes the storage space distribution of the storage system, the execution body may store the to-be-sharded model parameter set in the storage system based on the attribute information by performing the following two steps.

In a first step, a model parameter allocation table is generated based on the attribute information.

In the implementations, based on the obtained attribute information, the execution body may generate the model parameter allocation table in various ways. The model parameter allocation table may represent a correspondence relationship between the to-be-sharded model parameter set and storage locations of the storage system. As an example, the execution body may generate a placement plan by using Tensorflow as the model parameter allocation table. The placement plan may be generated based on a Placement preset by the user, or may be generated by a Placer tool in the Tensorflow.

In a second step, based on the model parameter allocation table, the to-be-sharded model parameter set is stored in a corresponding storage location in the storage system, and a query interface is generated.

In the implementations, based on the model parameter allocation table generated in the first step, the execution body may store the to-be-sharded model parameter set in a corresponding storage location in the storage system in various ways. The storage location may correspond to the storage system. As an example, in the PS architecture of Tensorflow, the execution body may transmit an instruction to each of the parameter servers based on the placement plan as the model parameter allocation table, so that each of the parameter servers stores a corresponding to-be-sharded model parameter set in a storage system of the parameter server, as the corresponding storage location in the storage system, by loading a corresponding multi-dimensional array. Then, the execution body may further generate a query interface of the storage system. As an example, the execution body may insert Send/Receive and other nodes in corresponding positions based on the placement plan by using a tool in Tensorflow.

Based on the optional implementation, the execution body may directly store a large-scale feature embedding in the parameter servers in a distributed manner by using the PS architecture of Tensorflow, reducing the occupation of the system memory by the model in inferring the model, thereby improving the utilization of system resources without changing the original architecture.

In some optional implementations of the embodiment, the execution body may further perform the following three steps.

In a first step, a feature embedding query operation corresponding to the to-be-sharded model parameter set is received.

In the implementations, the execution body may receive a feature embedding query operation corresponding to the to-be-sharded model parameter set. The feature embedding query operation may generally be transmitted by the system on which the model corresponding to the to-be-sharded model parameter set operates. As an example, the feature embedding query operation may be, for example, a function of "tf.nn.embedding_lookup" in Tensorflow.

In a second step, based on the feature embedding query operation, the storage system is queried for a result matching the feature embedding query operation.

In the implementations, based on the feature embedding query operation received in the first step, the execution subject may query the storage system for a result matching the feature embedding query operation in various ways. The result matching the feature embedding query operation may usually be a feature embedding. As an example, the execution subject may query the storage system for the result matching the feature embedding query operation by using a retrieval system of the storage system.

In a third step, the result matching the feature embedding query operation is transmitted.

In the implementations, the execution body may transmit the result matching the feature embedding query operation queried in the second step to a target device. The target device may be any device determined in advance. The target device may be the device transmitting the feature embedding query operation.

Based on the above optional implementations, the execution body may return the feature embedding corresponding to the model parameter set based on the query function of the storage system to realize the same function as the overall loading of the model by using the storage system, which is suitable for a model inference process.

Figure 3:
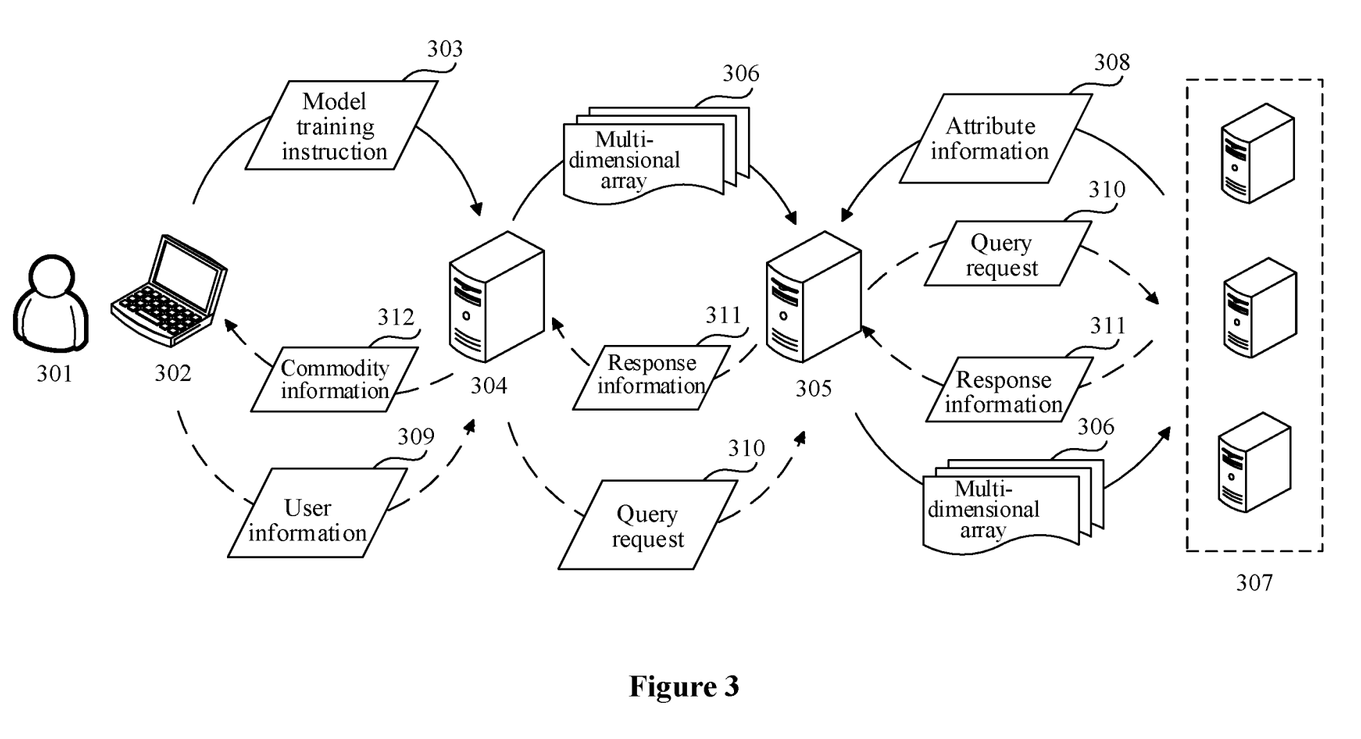
FIG. 3 is a schematic diagram of an application scenario of a method for processing model parameters according to an embodiment of the present disclosure.

Reference is made to FIG. 3, which is a schematic diagram of an application scenario of a method for processing model parameters according to an embodiment of the present disclosure. In the application scenario shown in FIG. 3, the user 301 transmits a model training instruction 303 to a background server 304 by using a terminal device 302. The background server 304 may perform training on a pre-stored initial commodity prediction model to obtain a commodity prediction model. The commodity prediction model may be a neural network model for representing a correspondence relationship between user information and commodity information that the user is interested in. A server 305 obtains a multi-dimensional array 306, used for feature embedding, in the trained commodity prediction model from the background server 304. Then, the server 305 obtains attribute information 308 of a server cluster 307. Based on the attribute information 308, the server 305 stores the multi-dimensional array 306 in the server cluster 307. Optionally, the user 301 may transmit user information 309 to the background server 304 by using the terminal device 302 to perform commodity prediction. In performing the commodity prediction, the background server 304 transmits a query request 310 to the server 305 for querying a feature embedding corresponding to the user information 309. The server 305 transmits the received query request 310 to the server cluster 307. The server cluster 307 returns response information 311 including the feature embedding corresponding to the user information 309 to the server 305. The server 305 returns the response information 311 including the feature embedding corresponding to the user information 309 to the background server 304. The background server 304 inputs the received feature embedding to a network layer in the commodity prediction model, and obtains commodity information 312, corresponding to the user information 309, that the user is interested in. The background server 304 may transmit the commodity information 312 to the terminal device 302 for display to the user 301 for viewing.

At present, in the conventional technology, the feature embedding is usually loaded, as a model parameter, in the memory together with other parameters of the model in operation, resulting in that the service scale of the model in operation is limited by a size of a memory of a single machine and a low utilization of CPU and network resources, and limiting the size of the model. However, with the method according to the embodiments of the present disclosure, the to-be-sharded model parameter set is stored in a system different from the system on which the model operates, so that the model parameter set that occupies a large space is separated from the system on which the model operates, thereby optimizing the parameter storage of large-scale feature embedding and improving resource utilization efficiency.

Figure 4:
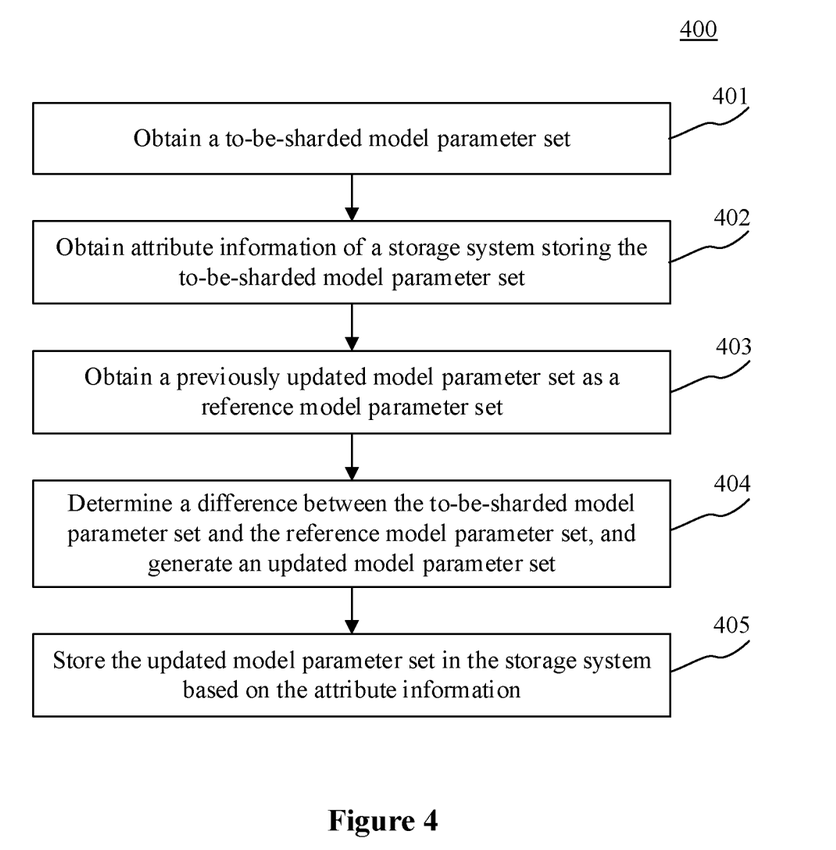
FIG. 4 is a flow chart of a method for processing model parameters according to another embodiment of the present disclosure.

Reference is made to FIG. 4, which shows a flow chart 400 of a method for processing model parameters according to another embodiment of the present disclosure. The flow chart 400 of the method for processing model parameters includes the following steps 401 to 405.

In step 401, a to-be-sharded model parameter set is obtained.

In step 402, attribute information of a storage system storing the to-be-sharded model parameter set is obtained.

In the embodiment, the attribute information may include an identifier of a key-value storage system.

The steps 401 and 402 are respectively consistent with the steps 201 and 202 in the above embodiments. The descriptions of the steps 201 and 202 are applicable to the steps 401 and 402, and are not repeated herein.

In step 403, a previously updated model parameter set is obtained as a reference model parameter set.

In the embodiment, the execution body of the method for processing model parameters (for example, the server 107 shown in FIG. 1) may obtain a previously updated model parameter set as a reference model parameter set in various ways. The previously updated model parameter set may correspond to the same model as the to-be-sharded model parameter set. In practice, it is often required to perform iteration for training a model. The previously updated model parameter set may be a model parameter set stored before performing the latest iteration on the to-be-sharded model parameter set.

In step 404, a difference between the to-be-sharded model parameter set and the reference model parameter set is determined, and an updated model parameter set is generated.

In the embodiment, the execution body may determine a difference between the to-be-sharded model parameter set and the reference model parameter set obtained in step 403 in various ways, and generate an updated model parameter set. The updated model parameter set represents an updated part between last two model parameter sets. As an example, the execution body may perform a difference between the to-be-sharded model parameter set and the reference model parameter set obtained in step 403 to generate the updated model parameter set.

In step 405, the updated model parameter set is stored in the storage system based on the attribute information.

In the embodiment, based on the attribute information obtained in step 402, the execution body may store the updated model parameter set in the storage system in various ways. The storage system may include a remote key-value storage system with a disaster tolerance and scalable capacity mechanism. With the lightweight and high-performance key-value storage system, it is convenient to perform operation and maintenance on the system. As an example, the execution body may map the updated model parameter set to the key-value storage system in various ways.

In some optional implementations of the embodiment, the execution body may further perform the following four steps.

In a first step, a feature embedding query operation corresponding to the to-be-sharded model parameter set is received.

The first step may be consistent with a corresponding step in the optional implementations of step 203 in the above embodiment, and is not repeated herein.

In a second step, a corresponding number of remote procedure call requests are generated based on the feature embedding query operation.

In the implementations, based on the feature embedding query operation, the execution subject may generate a corresponding number of remote procedure call requests in various ways. The remote procedure call requests may represent a result of the query in the target system that matching the feature embedding query operation. As an example, the execution body may replace an embedding lookup operation with remote procedure call requests of the storage system. A feature embedding query operation may correspond to a corresponding number of remote procedure call requests.

Optionally, in order to prevent a large amount of network resources occupied by too many remote procedure call requests, the execution body may generate one remote procedure call request after receiving a preset number of feature embedding query operations. The generated remote procedure call request includes request contents corresponding to the feature embedding query operations. Thus, the performance of the entire system can be improved by reducing the number of connections and the occupation of network bandwidth.

In a third step, the remote procedure call requests are transmitted to the key-value storage system.

In the implementations, the execution subject may transmit the remote procedure call requests to the key-value storage system in various ways, so that the key-value storage system queries the result matching the feature embedding query operation. The result matching the feature embedding query operation may generally include a feature embedding.

In a fourth step, in response to receiving response information from the key-value storage system including a result that matches the feature embedding query operation, the result that matches the feature embedding query operation is transmitted.

In the implementations, in response to receiving the response information from the key-value storage system, the execution body may transmit the result that matches the feature embedding query operation to a target device. The target device may be any device determined in advance. The target device may be the device transmitting the feature embedding query operation.

Based on the above optional implementations, the execution body may convert the feature embedding query operation in a complete loading model mode according to the conventional technology to remote procedure call requests transmitted to the key-value storage system, so that it is unnecessary to load multi-dimensional arrays including large-scale feature embedding to the memory in loading a native model (such as a Tensorflow Model) on a single machine while the model is operating. Therefore, the feature embedding of the model is no longer limited by the type of the operating model, and the number of models that a single machine is capable of supporting is greatly increases, thereby improving the utilization and service performance of the system.

It can be seen from FIG. 4 that in the flow chart 400 of the method for processing model parameters according to the embodiments, the difference between the to-be-sharded model parameter set and the previously updated model parameter set is determined, the updated model parameter set is generated, and the updated model parameter set is stored in the storage system. Therefore, with the solutions according to the embodiments, it is unnecessary to update all but only the parts that required to be changed in updating parameters, thereby reducing the network transmission traffic and improving the service performance of the system.

Figure 5:
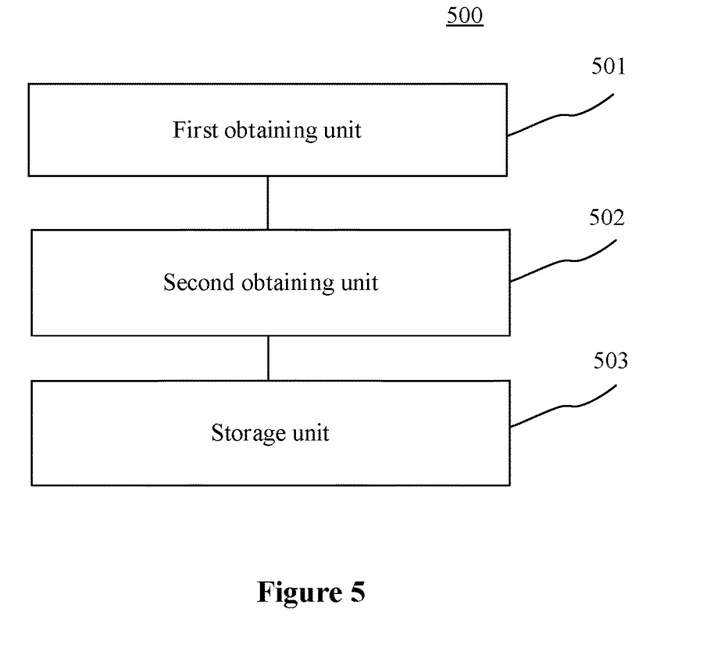
FIG. 5 is a schematic structural diagram of an apparatus for processing model parameters according to an embodiment of the present disclosure.

Referring to FIG. 5, as an implementation of the method shown in the above Figures, an apparatus for processing model parameters is provided according to an embodiment of the present disclosure. The apparatus embodiments correspond to the above method embodiments shown in FIG. 2. Specifically, the apparatus may be applied to various electronic devices.

As shown in FIG. 5, the apparatus 500 for processing model parameters according to the embodiment includes: a first obtaining unit 501, a second obtaining unit 502, and a storage unit 503. The first obtaining unit 501 is configured to obtain a to-be-sharded model parameter set, where the model parameter set includes a multi-dimensional array corresponding to a feature embedding. The second obtaining unit 502 is configured to obtain attribute information of a storage system storing the to-be-sharded model parameter set, where the storage system storing the to-be-sharded model parameter set is different from a system on which a model corresponding to the to-be-sharded model parameter set operates. The storage unit 503 is configured to store the to-be-sharded model parameter set in the storage system based on the attribute information.

In the embodiment, the processing of the first obtaining unit 501, the second obtaining unit 502, and the storage unit 503 included in the apparatus for processing model parameters and the technical effects obtained by performing the processing may refer to the descriptions of the steps 201, 202, and 203 in the embodiments corresponding to FIG. 2, and are not repeated herein.

In some optional implementations of the embodiment, the first obtaining unit 501 may include a first obtaining sub-unit (not shown in the Figures), an analysis sub-unit (not shown in the Figures), an extraction sub-unit (not shown in the Figures), and a second obtaining sub-unit (not shown in the Figures). The first obtaining sub-unit may be configured to obtain a model file corresponding to the to-be-sharded model parameter set. The analysis sub-unit may be configured to performing analysis on the model file to obtain an analysis graph corresponding to the model file, where the analysis graph includes variables and operations on the variables. The extraction sub-unit may be configured to extract a variable from the analysis graph as a target variable based on a preset field. The second obtaining sub-unit may be configured to obtain the to-be-sharded model parameter set based on a feature embedding corresponding to the target variable.

In some optional implementations of the embodiment, the second obtaining sub-unit 502 may include a first obtaining module (not shown in the Figures) and a second obtaining module (not shown in the Figures). The first obtaining module may be configured to obtain a data amount of a multi-dimensional array corresponding to the feature embedding corresponding to the target variable. The second obtaining module may be configured, in response to determining that the obtained data amount is greater than a preset data amount threshold, obtain the multi-dimensional array corresponding to the feature embedding corresponding to the target variable as the to-be-sharded model parameter set.

In some optional implementations of the embodiment, the apparatus 500 for processing model parameters may further include: a first reception unit (not shown in the Figures), a first querying unit (not shown in the Figures), and a first transmission unit (not shown in the Figures). The first reception unit may be configured to receive a feature embedding query operation corresponding to the to-be-sharded model parameter set. The first querying unit may be configured, based on the feature embedding query operation, to query the storage system for a result matching the feature embedding query operation. The first transmission unit may be configured to transmit the result matching the feature embedding query operation.

In some optional implementations of the embodiment, the attribute information may include storage space distribution of the storage system. The storage unit 503 may include a first generation sub-unit (not shown in the Figures) and a first storage sub-unit (not shown in the Figures). The first obtaining unit 501 may include a first obtaining sub-unit (not shown in the Figures), an analysis sub-unit (not shown in the Figures), an extraction sub-unit (not shown in the Figures), and a second obtaining sub-unit (not shown in the Figures). The first generation sub-unit is configured to generate a model parameter allocation table based on the attribute information, where the model parameter allocation table represents a correspondence relationship between the to-be-sharded model parameter set and storage locations of the storage system. The first storage sub-unit is configured, based on the model parameter allocation table, to store the to-be-sharded model parameter set in a corresponding storage location in the storage system, and generate a query interface.

In some optional implementations of the embodiment, the attribute information may include an identifier of a key-value storage system. The storage unit 503 may include a third obtaining sub-unit (not shown in the Figures), a second generation sub-unit (not shown in the Figures), and a second storage sub-unit (not shown in the Figures). The third obtaining sub-unit is configured to obtain a previously updated model parameter set as a reference model parameter set. The second generation sub-unit is configured to determine a difference between the to-be-sharded model parameter set and the reference model parameter set, and generate an updated model parameter set. The second storage sub-unit is configured to store the updated model parameter set in the storage system based on the attribute information.

In some optional implementations of the embodiment, the apparatus for processing model parameters may further include a second reception unit (not shown in the Figures), a generating unit (not shown in the Figures), a second transmission unit (not shown in the Figures), and a third transmission unit (not shown in the Figures). The second reception unit is configured to receive a feature embedding query operation corresponding to the to-be-sharded model parameter set. The generation unit is configured to generate a corresponding number of remote procedure call requests based on the feature embedding query operation. The second transmission unit is configured to transmit the remote procedure call requests to the key-value storage system. The third transmission unit is configured, in response to receiving response information from the key-value storage system including a result that matches the feature embedding query operation, to transmit the result that matches the feature embedding query operation.

With the apparatus according to the embodiments of the present disclosure, the first obtaining unit 501 obtains the to-be-sharded model parameter set, where the model parameter set includes the multi-dimensional array corresponding to the feature embedding. The second obtaining unit 502 obtains attribute information of the storage system storing the to-be-sharded model parameter set, where the storage system storing the to-be-sharded model parameter set is different from the system on which the model corresponding to the to-be-sharded model parameter set operates. The storage unit 503 stores the to-be-sharded model parameter set in the storage system based on the attribute information. Therefore, the model parameter set that occupies a large space is separated from the system on which the model operates, thereby optimizing the parameter storage of large-scale feature embedding and improving resource utilization efficiency.

Hereinafter, reference is made to FIG. 6, which shows a schematic structural diagram of an electronic device 600 (such as the server shown in FIG. 1) suitable for implementing the embodiments of the present disclosure. The terminal devices according to the embodiments of the present disclosure may include, but are not limited to, mobile terminals, such as mobile phones, laptops, digital broadcast receivers, PDAs (personal digital assistants), PADs (tablet PCs), PMPs (portable multimedia players) and vehicle-mounted terminals (such as in-vehicle navigation terminals), and fixed terminals such as digital TVs and desktop computers. The server shown in FIG. 6 is only exemplary, and should not indicate any limitation to the function and application scope of the embodiments of the present disclosure.

Figure 6:
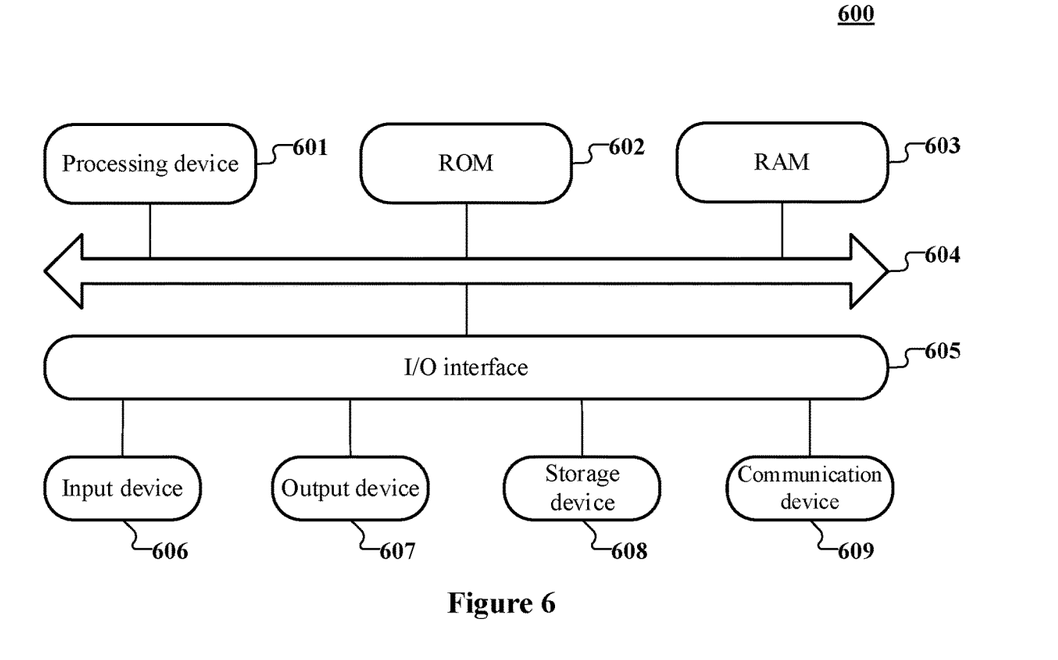
FIG. 6 is a schematic structural diagram of an electronic device suitable for implementing the embodiments of the present disclosure.

As shown in FIG. 6, the electronic device 600 may include a processing device 601 (such as a central processor and a graphics processor) which may execute various operations and processing through a program stored in a Read Only Memory (ROM) 602 or a program loaded from the storage device 608 into a Random Access Memory (RAM) 603. The RAM 603 is further configured to store various programs and data required by the electronic device 600. The processing device 601, the ROM 602 and the RAM 603 are connected to each other through a bus 604. An Input/output (I/O) interface 605 is also connected to the bus 604.

Generally, the I/O interface 605 may be connected to: an input device 606, such as a touch screen, a touch panel, a keyboard and a mouse; an output device 607, such as a liquid crystal display (LCD), a speaker, and a vibrator; a storage device 608, such as a magnetic tape and a hard disk; and a communication device 609. The communication device 609 enables the electronic device 600 to perform wireless or wired communication with other devices for data exchanging. Although FIG. 6 shows an electronic device 600 having various components, it should be understood that the illustrated components are not necessarily required to all be implemented or included. Alternatively, more or fewer components may be implemented or included. Each of the blocks shown in FIG. 6 may represent one device, or may represent multiple devices as required.

Particularly, according to the embodiments of the present disclosure, the process described above in conjunction with flow charts may be implemented as a computer software program. For example, a computer program product is further provided according to an embodiment of the present disclosure, including a computer program carried on a computer readable medium. The computer program includes program codes for performing the method shown in the flow charts. In the embodiments, the computer program may be downloaded and installed from the network via the communication device 609, or installed from the storage device 608, or installed from the ROM 602. When the computer program is executed by the processing device 601, the above-mentioned functions defined in the method according to the embodiments of the present disclosure are performed.

It should be noted that, the computer readable medium according to the embodiments of the present disclosure may be a computer readable signal medium or a computer readable storage medium or any combination thereof. The computer readable storage medium may be, but is not limited to, a system, an apparatus, or a device in an electronic, magnetic, optical, electromagnetic, infrared, or semiconductive form, or any combination thereof. The computer readable storage medium may be, but is not limited to, an electrical connection with one or more wires, a portable computer disk, a hard disk, a random access memory (RAM), a read-only memory (ROM), an erasable programmable read-only memory (EPROM or flash memory), an optical fiber, a portable compact disc read-only memory (CD-ROM), a light storage device, a magnetic storage device or any combination thereof. In the embodiments of the present disclosure, the computer readable storage medium may be any tangible medium containing or storing a program, and the program may be used by or in combination with an instruction execution system, apparatus, or device. In the embodiments of the present disclosure, the computer readable signal medium may be a data signal transmitted in a baseband or transmitted as a part of a carrier wave and carrying computer readable program codes. The transmitted data signal may be in various forms, including but not limited to an electromagnetic signal, an optical signal or any proper combination thereof. The computer readable signal medium may be any computer readable medium other than the computer readable storage medium and can send, propagate or transmit programs to be used by or with an instruction execution system, apparatus or device. The program codes stored in the computer readable medium may be transmitted via any proper medium including but not limited to: wired, optical fiber cable, radio frequency (RF), or any suitable combination of the foregoing.

The computer readable medium may be included in the server, or may exist independently without being assembled into the server. The computer readable medium stores one or more programs. The one or more programs, when executed by the server, cause the server to: obtain a to-be-sharded model parameter set, where the model parameter set includes a multi-dimensional array corresponding to a feature embedding; obtain attribute information of a storage system storing the to-be-sharded model parameter set, where the storage system storing the to-be-sharded model parameter set is different from a system on which a model corresponding to the to-be-sharded model parameter set operates; and store the to-be-sharded model parameter set in the storage system based on the attribute information.

Computer program code for performing operations of the present disclosure may be written in one or more programming languages, or a combination of the foregoing, and the programming language includes, but is not limited to, object oriented programming languages, such as Java, Smalltalk, and C++, also includes conventional procedural programming languages, such as "C" language or similar programming languages. The program codes may be executed entirely on a user's computer, or be executed partly on the user's computer, or be executed as a stand-alone software package, or be executed partly on the user's computer and partly on a remote computer, or be executed entirely on the remote computer or server. In a case that the execution of the program code involves a remote computer, the remote computer may be connected to a user's computer via any kind of network, including a local area network (LAN) or a wide area network (WAN), or may be connected to an external computer (for example, via an Internet providing by an Internet service provider).

The flow charts and block diagrams in the Figures shows the architecture, functionality and operation of possible implementations of the products of system, method and computer program provided according to the embodiments of the present disclosure. Each block in the flow charts or block diagrams can represent a module, a program segment, or a part of code, and the module, the program segment, or the part of code includes one or more executable instructions for implementing specified logical functions. It should be noted that in some alternative implementations, the functions noted in the blocks may be implemented in a different order than those illustrated in the Figures. For example, two blocks shown in succession may in fact be executed substantially in parallel, and they may sometimes be executed in a reverse order, depending upon the functionality involved. It also should be noted that each block in the schematic diagrams and/or flow charts, and combinations of blocks in the schematic diagrams and/or flowcharts, can be implemented by a dedicated hardware-based system which is configured to implement specified functions or operations, or can be implemented by using a combination of dedicated hardware and computer instructions.

The units mentioned in the description of the embodiments of the present disclosure may be implemented by means of software, or otherwise by means of hardware. The units may be arranged in the processor, for example, it may be described as: a processor, including a first obtaining unit, a second obtaining unit, and a storage unit. The designation of these units does not in any case constitute a qualification of the unit itself. For example, the first obtaining unit may be described as "a unit for obtaining a to-be-sharded model parameter set, where the model parameter set includes a multi-dimensional array corresponding to a feature embedding".

The above description includes merely preferred embodiments of the present disclosure and explanations of technical principles used. Those skilled in the art should understand that the scope of the embodiments of the present disclosure is not limited to technical solutions formed by a specific combination of the above technical features, but covers other technical solutions formed by any combination of the above technical features or equivalent features thereof without departing from the concept of the present disclosure. For example, a technical solution formed by interchanging the above features with technical features having similar functions as disclosed (but not limited thereto) is also covered in the scope of the present disclosure.

The invention claimed is:

1. A method of optimizing parameter storage of large-scale feature embedding for machine learning models, comprising:
obtaining a model parameter set, wherein the model parameter set comprises a multi-dimensional array corresponding to a feature embedding, wherein the obtaining a model parameter set further comprises:
obtaining a model file,
performing analysis on the model file to obtain an analysis graph corresponding to the model file, wherein the analysis graph comprises variables and operations on the variables,
extracting a variable from the analysis graph as a target variable based on a preset field, and
obtaining the model parameter set based on the feature embedding corresponding to the target variable, wherein the obtaining the model parameter set based on the feature embedding corresponding to the target variable further comprises:
obtaining a data amount of the multi-dimensional array corresponding to the feature embedding corresponding to the target variable, and
in response to determining that the obtained data amount is greater than a preset data amount threshold, obtaining the multi-dimensional array corresponding to the feature embedding corresponding to the target variable as the model parameter set;
obtaining attribute information of a storage system storing the model parameter set, wherein the storage system storing the model parameter set is different from a system on which a model corresponding to the model parameter set operates; and
storing the model parameter set in the storage system based on the attribute information.

2. The method according to claim 1, further comprising:
receiving a feature embedding query operation corresponding to the model parameter set;
based on the feature embedding query operation, querying the storage system for a result matching the feature embedding query operation; and
transmitting the result matching the feature embedding query operation.

3. The method according to claim 1, wherein the attribute information comprises storage space distribution of the storage system; and wherein the storing the model parameter set in the storage system based on the attribute information comprises:
generating a model parameter allocation table based on the attribute information, wherein the model parameter allocation table represents a correspondence relationship between the model parameter set and storage locations of the storage system; and
based on the model parameter allocation table, storing the model parameter set in a corresponding storage location in the storage system, and generating a query interface.

4. The method according to claim 1, wherein the attribute information comprises an identifier of a key-value storage system; and wherein the storing the model parameter set in the storage system based on the attribute information comprises:
obtaining a previously updated model parameter set as a reference model parameter set;
determining a difference between the model parameter set and the reference model parameter set, and generating an updated model parameter set;
storing the updated model parameter set in the storage system based on the attribute information.

5. The method according to claim 4, further comprising:
receiving a feature embedding query operation corresponding to the model parameter set;
generating a corresponding number of remote procedure call requests based on the feature embedding query operation;
transmitting the remote procedure call requests to the key-value storage system; and
in response to receiving response information from the key-value storage system comprising a result that matches the feature embedding query operation, transmitting the result that matches the feature embedding query operation.

6. An apparatus of optimizing parameter storage of large-scale feature embedding for machine learning models, comprising:
one or more processors; and
a storage device, storing one or more programs; wherein the one or more programs, when executed by the one or more processors, cause the one or more processors to perform operations comprising:
obtaining a model parameter set, wherein the model parameter set comprises a multi-dimensional array corresponding to a feature embedding, wherein the obtaining a model parameter set further comprises:
obtaining a model file,
performing analysis on the model file to obtain an analysis graph corresponding to the model file, wherein the analysis graph comprises variables and operations on the variables,
extracting a variable from the analysis graph as a target variable based on a preset field, and
obtaining the model parameter set based on the feature embedding corresponding to the target variable, wherein the obtaining the model parameter set based on the feature embedding corresponding to the target variable further comprises:
obtaining a data amount of the multi-dimensional array corresponding to the feature embedding corresponding to the target variable, and
in response to determining that the obtained data amount is greater than a preset data amount threshold, obtaining the multi-dimensional array corresponding to the feature embedding corresponding to the target variable as the model parameter set;
obtaining attribute information of a storage system storing the model parameter set, wherein the storage system storing the model parameter set is different from a system on which a model corresponding to the model parameter set operates; and
storing the model parameter set in the storage system based on the attribute information.

7. The apparatus according to claim 6, wherein the one or more programs, when executed by the one or more processors, cause the one or more processors to perform operations comprising:
receiving a feature embedding query operation corresponding to the model parameter set;
based on the feature embedding query operation, querying the storage system for a result matching the feature embedding query operation; and
transmitting the result matching the feature embedding query operation.

8. The apparatus according to claim 6, wherein the attribute information comprises storage space distribution of the storage system; and wherein the one or more programs, when executed by the one or more processors, cause the one or more processors to perform operations comprising:
generating a model parameter allocation table based on the attribute information, wherein the model parameter allocation table represents a correspondence relationship between the model parameter set and storage locations of the storage system; and
based on the model parameter allocation table, storing the model parameter set in a corresponding storage location in the storage system, and generating a query interface.

9. The apparatus according to claim 6, wherein the attribute information comprises an identifier of a key-value storage system; and wherein the one or more programs, when executed by the one or more processors, cause the one or more processors to perform operations comprising:
obtaining a previously updated model parameter set as a reference model parameter set;
determining a difference between the model parameter set and the reference model parameter set, and generating an updated model parameter set;
storing the updated model parameter set in the storage system based on the attribute information.

10. The apparatus according to claim 9, wherein the one or more programs, when executed by the one or more processors, cause the one or more processors to perform operations comprising:
receiving a feature embedding query operation corresponding to the model parameter set;
generating a corresponding number of remote procedure call requests based on the feature embedding query operation;
transmitting the remote procedure call requests to the key-value storage system; and
in response to receiving response information from the key-value storage system comprising a result that matches the feature embedding query operation, transmitting the result that matches the feature embedding query operation.

11. A non-transitory computer-readable medium storing a computer program, wherein the computer program, when executed by a processor, causes the processor to perform operations comprising:
obtaining a model parameter set, wherein the model parameter set comprises a multi-dimensional array corresponding to a feature embedding, wherein the obtaining a model parameter set further comprises:
obtaining a model file,
performing analysis on the model file to obtain an analysis graph corresponding to the model file, wherein the analysis graph comprises variables and operations on the variables,
extracting a variable from the analysis graph as a target variable based on a preset field, and
obtaining the model parameter set based on the feature embedding corresponding to the target variable, wherein the obtaining the model parameter set based on the feature embedding corresponding to the target variable further comprises:
obtaining a data amount of the multi-dimensional array corresponding to the feature embedding corresponding to the target variable, and
in response to determining that the obtained data amount is greater than a preset data amount threshold, obtaining the multi-dimensional array corresponding to the feature embedding corresponding to the target variable as the model parameter set;
obtaining attribute information of a storage system storing the model parameter set, wherein the storage system storing the model parameter set is different from a system on which a model corresponding to the model parameter set operates; and
storing the model parameter set in the storage system based on the attribute information.

12. The non-transitory computer-readable medium according to claim 11, the operations further comprising:
receiving a feature embedding query operation corresponding to the model parameter set;
based on the feature embedding query operation, querying the storage system for a result matching the feature embedding query operation; and
transmitting the result matching the feature embedding query operation.

13. The non-transitory computer-readable medium according to claim 11, wherein the attribute information comprises storage space distribution of the storage system; and wherein the storing the model parameter set in the storage system based on the attribute information comprises:
generating a model parameter allocation table based on the attribute information, wherein the model parameter allocation table represents a correspondence relationship between the model parameter set and storage locations of the storage system; and
based on the model parameter allocation table, storing the model parameter set in a corresponding storage location in the storage system, and generating a query interface.

14. The non-transitory computer-readable medium according to claim 11, wherein the attribute information comprises an identifier of a key-value storage system; and wherein the storing the model parameter set in the storage system based on the attribute information comprises:
  obtaining a previously updated model parameter set as a reference model parameter set;
  determining a difference between the model parameter set and the reference model parameter set, and generating an updated model parameter set;
  storing the updated model parameter set in the storage system based on the attribute information.

15. The non-transitory computer-readable medium according to claim 14, the operations further comprising:
  receiving a feature embedding query operation corresponding to the model parameter set;
  generating a corresponding number of remote procedure call requests based on the feature embedding query operation;
  transmitting the remote procedure call requests to the key-value storage system; and
  in response to receiving response information from the key-value storage system comprising a result that matches the feature embedding query operation, transmitting the result that matches the feature embedding query operation.

\* \* \* \* \*

UNITED STATES PATENT AND TRADEMARK OFFICE
CERTIFICATE OF CORRECTION

PATENT NO. : 11,809,429 B2
APPLICATION NO. : 17/886746
DATED : November 7, 2023
INVENTOR(S) : Cheng Chen et al.

It is certified that error appears in the above-identified patent and that said Letters Patent is hereby corrected as shown below:

On the Title Page

Please add the 12th inventor as shown:
(72) Inventors: Cheng Chen, Beijing (CN); Peng Zhao, Beijing (CN); Di Wu, Beijing (CN); Junyuan Xie, Beijing (CN); Chenliaohui Fang, Beijing (CN); Longyijia Li, Beijing (CN); Long Huang, Beijing (CN); Liangchao Wu, Beijing (CN); Long Chang, Beijing (CN); Lizhe Zhang, Beijing (CN); Yixiang Chen, Beijing (CN); Peng Zhao, Beijing (CN); Xiaobing Liu, Beijing (CN)

Signed and Sealed this
Tenth Day of September, 2024

Katherine Kelly Vidal
*Director of the United States Patent and Trademark Office*